Patented July 7, 1931

1,813,883

UNITED STATES PATENT OFFICE

HOMER BEHM, OF TULSA, OKLAHOMA

TREATMENT OF PETROLEUM OILS

No Drawing. Application filed May 9, 1923. Serial No. 637,889.

The present invention relates to treating petroleum oil material and constitutes an improvement upon the process described in my copending application 575,040 filed July 14, 1922. In accordance with the process of said application, I first prepare an intermediate product, hereinafter referred to for convenience as "starter", which step may be carried out in a number of different ways. This starter is then added to a large amount of petroleum oil to be treated, for example, one part of starter to 400 to 800 parts of oil, more or less. Alcohol, amounting to 1 or 2% of the oil under treatment is then added and aeration is then started, which aeration is preferably continued for a period of three or four days or longer, 1% of water, based on the qauntity of oil under treatment, being added each day.

The starter above referred to may be prepared in a simple manner by adding to kerosene or similar oil, for each 5 gallons of the latter, 1 quart of slaked lime, 1 pint of finely ground rosin, 8 ounces of formaldehyde solution of about 40% strength, and 4 fluid ounces of strong aqua ammonia and then allowing the mixture to stand for a day or so, then filtering, heating up to say 110 or 120° F., and then adding 8 fluid ounces of turpentine.

In a more refined manner of making the starter which seems to produce a better starter material, I place 400 gallons of commercial kerosene, into a tank, add 20 gallons of slaked lime, 10 gallons of finely powdered rosin, 5 gallons of strong ammonia water of 28% strength, 10 gallons of a solution of formaldehyde of about 40% strength, allow this mixture to stand 24 hours. In a separate glass vessel I place 12 gallons of denatured alcohol, 6 gallons of acetone, 3 gallons of tincture of iodine and add 5 gallons of slaked lime and 2.5 gallons of powdered rosin and 5 gallons of ground orange peel. This mixture is allowed to stand in the dark for 24 hours and is then mixed with the first mixture above referred to. The complete mixture is then allowed to stand for 24 hours, 6 gallons of dry bleaching powder is added and the mixture again allowed to stand 24 hours. The liquid is then withdrawn and filtered and is heated slowly up to about 90 to 120° F., and 3 gallons of rectified oil of turpentine is added. All of these operations are preferably conducted in the dark, and the starter material is preferably kept in the drak, after being made.

In accordance with the improvements forming the subject matter of the present case, the starter may be prepared as above described or as described in numerous examples and modifications given in my copending application filed May 9, 1923 (now U. S. Patent No. 1,541,243) and Patent No. 1,541,241.

1 part of the starter is added to say 400 to 800 parts of the kerosene or other oil to be treated, and after waiting several hours, 1 to 2% of denatured alcohol is then added and the aeration is then started, which aeration is preferably continued for 3 or 4 days or more. It is advisable to wait for several hours after adding the alcohol before adding the water and in practice, I find that two or three hours is a convenient length of time.

The length of time to wait in each of the above cases will depend to a considerable extent upon the size of the batch of material being treated. If the treatment is being conducted with a small experimental batch, of say 1 gallon of kerosene, it is advisable to wait 10 or 20 minutes before making the addition; if on the contrary a commercial run is being made with 40,000 gallons, it is advisable to wait for two or three hours before making the addition. The aeration is continued for three or four days, suitable additions of water or other activating agents being made from time to time, say once a day during such treatment. At the end of the aeration treatment referred to, a small amount of acetic acid or other acid material is added, sufficient to completely neutralize the small degree of alkalinity in the liquid and to make the material slightly acid. The material is then heated to about 150 to 200° F., after which lime is added to completely neutralize the acidity and the oil is filtered.

In the improvements constituting the present invention, I find that instead of water, various solutions can be used which are capable of making the process of adding oxygen to the oil more effectively. Thus to a mixture of 400 parts of kerosene and 1 part of starter, after the addition of 8 parts of alcohol, I may add 4 parts of a 5 or 10% or even a stronger solution of sodium nitrate. The next addition to this oil, made, say the following day, could be composed of the same amount (4 parts) a solution of sodium nitrate of the same strength, also containing about 1/800 of tincture of iodine and 1/300 of strong aqua ammonia.

The following day, in place of adding 4 parts of water, I can add 4 parts of a solution of phosphoric acid of about 2.5 per cent strength. This amount of acid will not normally be sufficient to completely neutralize the slight alkalinity of the oil and it is advisable to maintain a slight alkalinity in the oil throughout the aeration process, that is to say, up until the addition of acetic acid and heating.

I find that after the heating operation, I can allow the material to stand for a short time and the aqueous material will quickly settle to the bottom. I then draw off the oil into a separate receptacle, add sufficient lime or milk of lime to again render the oil slightly alkaline, and then aerate and then add enough water to bring the total water content up to about 3 to 5% and then aerate again for a day or two. During this operation considerable insoluble matter forms in the oil, the oil is then filtered, and is then ready for use for example, for blending with gasoline (an equal volume of gasoline may be used) of the production of a motor fuel, or it can be used without the addition of gasoline as a paint thinner or turpentine substitute.

In the above illustration I have referred particularly to the addition of sodium nitrate in the first step, a mixture of sodium nitrate and tincture of iodine and ammonia in the second step, and very dilute phosphoric acid in the third step. It will be understood however, that it is not necessary that the materials added in these successive steps be different from each other, but the same material can be added in each of the steps. It also is not necessary that a single substance should be used in the first step or that a mixed substance should be used in the second step, but the substances added in each of the steps may be either simple substances or mixed substances.

The substances above referred to, are, to some extent at least, soluble in water and aqueous solutions of these materials are used. It is also possible to use substances which irrespective of any solubility in water, are soluble in one or more of the other constituents of the mixture, that is to say, substances can be added which are soluble in the oil, or substances can be added which are soluble in alcohol, or substances can be added which are soluble in the mixture of alcohol and water, etc. As an example of a substance soluble in oil, I mention iodin. The iodin could, if desired, be dissolved in kerosene (this solution being made and preserved until used, in the dark) and such solution in iodin added to the oil in small amount. Various substances of an organic nature might also be useful in this process, being dissolved either in the water or in the alcohol or in the oil.

The most important substances thus far studied, which seem to give most promising results are inorganic compounds, especially nitrates, nitrites, sulfates, phosphates, molybdates, permanganates, chromates, vanadates, hypochlorites, although it is to be understood that the invention is not restricted to the use of such materials. The soluble salts of the above classes seem to be, generally speaking, useful. Among the sulfates, I would mention the soluble sulfates of the alkali metals, calcium, iron, manganese, magnesium, aluminum. Among the nitrates, those of the alkali metals, alkali earth metals, magnesium, and iron seem to be particularly promising. Of the phosphates and molybdates, permanganates, manganates, chromates, vanadates, I mention particularly those of the alkali metals and ammonium. Among the hypochlorite compounds, I mention bleaching powder or chlorinated lime, which is a relatively stable but highly active substance. Of the above compounds, those which contain both oxygen and another metalloid (nitrogen, sulfur, phosphorus or chlorin) are preferable to the molybdates, chromates and vanadates. Accordingly I prefer to use these, or some of them, whether or not the others are present.

Substances which contain both oxygen and nitrogen, such as nitrates, or mixtures of an oxygen containing substance and a nitrogen containing substance, such as a mixture of iron sulfate and an ammonium compound seem to lead to very favorable results. A small amount of a substance which although not containing oxygen is capable of exercising an oxidizing effect, for example, iodine, also is particularly advantageous, in this process.

I appreciate that within the scope of the above definitions of substances to be added are included many which are known to exercise more or less antiseptic effect as regards those bacteria which grow in aqueous materials, thus for instance, iodin is known to be destructive of such bacteria and ferment organisms as grow in aqueous liquids, but on the contrary it has, when used in very small amounts, as above referred to, been shown to have a stimulating effect on herein described treatment of hydrocarbon oils.

I claim:

1. In the treatment of mineral oil material by aeration, the improvement which comprises adding to a mixture containing water, alcohol and a mineral oil material, an aqueous solution containing a nitrate and containing the reaction products of ammonia and iodine.

2. In the treatment of mineral oil material by aeration, the improvement which comprises adding to a mixture containing water, alcohol and a mineral oil material, an aqueous solution containing a nitrate and containing the reaction products of ammonia and iodine and thereafter aerating the material at about ordinary atmospheric temperature.

In testimony whereof I affix my signature.

HOMER BEHM.